A. J. BANKS.
YEAST TESTER.
APPLICATION FILED AUG. 4, 1913.

1,104,766.

Patented July 28, 1914.

UNITED STATES PATENT OFFICE.

ARTHUR JOHN BANKS, OF ST. LAMBERT, QUEBEC, CANADA.

YEAST-TESTER.

1,104,766.  Specification of Letters Patent.  Patented July 28, 1914.

Application filed August 4, 1913. Serial No. 782,928.

*To all whom it may concern:*

Be it known that I, ARTHUR JOHN BANKS, a subject of the King of Great Britain, and resident of 169 Victoria avenue, in the town of St. Lambert, in the Province of Quebec and Dominion of Canada, have invented certain new and useful Improvements in Yeast-Testers; and I do hereby declare that the following is a full, clear, and exact description of the same.

The invention relates to improvements in yeast testers as described in the present specification and illustrated in the accompanying drawings that form part of the same.

The invention consists essentially in the novel adaptation of the gage glass or other suitable indicator to set forth the properties of the yeast.

The objects of the invention are to devise an apparatus that will enable the baker, the brewer, or other consumers of yeast, to ascertain just what power yeast has which is being supplied to them, to definitely decide where the fault is in the production of batches of bread, to economize in the use of the yeast where it is found that the gaseous properties of the yeast are superabundant and correspondingly to provide a plenteous supply of yeast to the baking where it is found that the gas producing property of the yeast are found wanting, and generally to provide a simple and efficient means for testing yeast that will be generally applicable in a commercial way.

Figure 2:
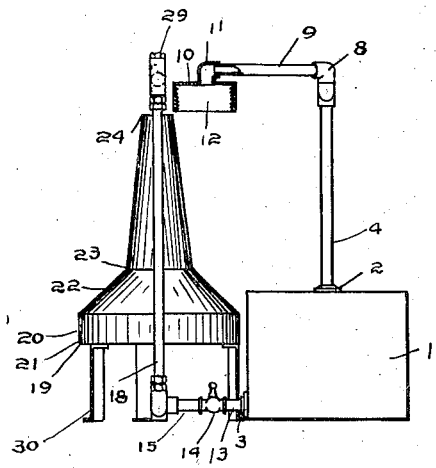
Figure 1:
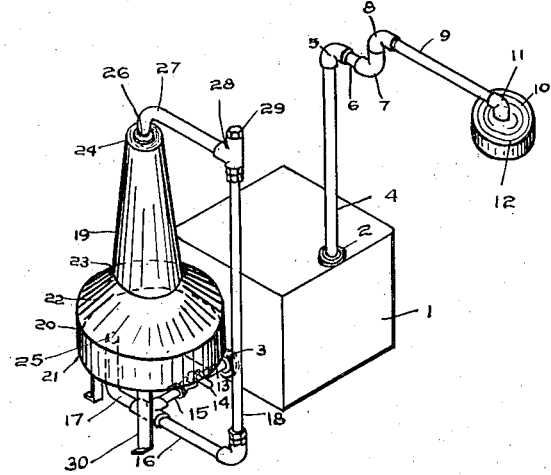
Figure 3:
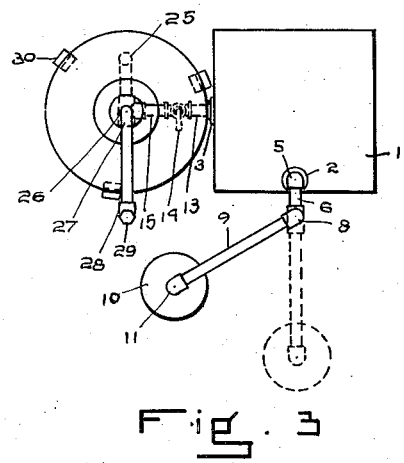

In the drawings, Figure 1 is a perspective view of the apparatus. Fig. 2 is a front elevation of the apparatus. Fig. 3 is a plan view.

Like numerals of reference indicate corresponding parts in each figure.

Referring to the drawings, 1 is a fluid receptacle partly filled with oil or other suitable liquid and having the gas inlet 2 at the upper end, and at the lower end in one of its side walls the liquid outlet 3.

4 is a stand pipe extending upwardly from the gas inlet 2.

5 is an elbow joint joining the horizontal pipe 6 with the stand pipe 4.

7 and 8 are elbow joints joining the pipe 6 to the pipe 9, said joint 8 being arranged to swing on the said joint 7 and in the interior thereof having a valve arrangement to cut off the connection between said pipe 6 and said pipe 9. This valve arrangement is not described herein as it is a very well known device in the arrangement of pipes and is used here for general convenience in the apparatus.

10 is a threaded socket having the elbow joint 11 secured to the top thereof and to the pipe 9.

It will be thus seen that there is a clear passage for gas from the interior of the threaded socket 10 through to the receptacle 1, and that it is only necessary to insert in the socket 10 the means for producing gas to have said gas travel to the receptacle 1 and therein affect the liquid in said receptacle by displacement.

12 is a flask having a neck screw-threaded into the socket 10 and containing a fermentable sugar so compounded as to constitute a standard yeast food of uniform strength along with a definite quantity or weight of the yeast to be tested. This flask is preferably immersed in a vessel containing water maintained at a uniform temperature by means of any suitable and adjustable supply of heat, such as that of a small burner, lamp or electric heater or other means. The arm is swung outwardly which is the position it takes when the valve on the joints 7 and 8 is in its open position, thus allowing free ingress for the gas to the receptacle 1. The fermentation thus goes on and the gas, carbon dioxid, evolved, passes through the pipes 9, 6 and 4 into the receptacle 1.

13 is an outlet pipe secured to the liquid outlet 3 having introduced therein intermediate of the length thereof the cut off valve 14.

15 and 16 are branch pipes from the end of the outlet 13 and communicating therewith, and at their ends communicating with the upwardly extending pipe 17 and the gage glass 18.

19 is a vessel having a vertical side wall 20 extending upwardly from the bottom 21 and a converging side wall 22 extending inwardly to the reduced upper portion 23, said upper portion 23 converging slightly from the lower end thereof to the top 24 and representing the frustum of the cone, said vessel 19 having an inlet 25 through the bottom thereof connected to the upwardly extending pipe 17 and an opening 26 in the top thereof connected by the pipe 27 to the gage glass mounting 28, said mounting 28 being hollow and having a screw cap 29 on the top thereof for admission of air.

30 are legs or brackets supporting the vessel 19 at or about the normal level of the liquid in the receptacle 1.

It has already been explained how the gas is generated and the direction of the flow of the gas, that is to say into the receptacle 1, and of course it will be understood that if this gas enters the receptacle 1 it must displace the oil in said receptacle, and as that oil is free to flow through the outlet 13, in fact as the said oil has already found its level in the gage glass 18, which level is the zero mark, the entrance of the gas raises the level in the gage glass though the rise is very slow because of the size of the vessel 19 at the lower end thereof, that is to say the rise is very gradual, though, as the fermentation continues, the rise of the liquid rapidly increases in speed because of the converging side walls of said vessel 19, and when the liquid reaches the reduced upper portion 23 its rise will be very quick and indicate the abundancy of the gaseous properties of the yeast, in other words point out that the said yeast can be used very economically and yet have the desired effect. The graduations on the gage glass are of course entirely a matter of convenience. They may indicate the volume of gas evolved, the weight of gas evolved, the amount of fermentable sugar decomposed by fermentation, the efficiency of the yeast in terms of a predetermined or arbitrary standard, the quantity or weight of yeast required to produce a definite amount of fermentation within a standard period of time and conversely the time required by a given amount of yeast to perform a definite amount of work by fermentation, or finally in several other ways to suit special requirements of industrial work or scientific research.

The simplicity of the apparatus will appeal to users of yeast as it can be supplied at a moderate cost and requires no special expenditure to maintain. The baker or other user can take several samples from different supplies of yeast that he has purchased and give it a thorough test in a comparatively short space of time, and then determine as to how the yeast is to be used. The dealers in yeast will also be placed in such a position that the properties of their yeast will be appreciated and thus keep up a standard by proof from their customers.

It must of course be understood that modifications may be made in this device so long as they are kept within the scope of the claims following.

What I claim is:—

1. In a yeast tester, a gage glass, a vessel adjacent to said gage glass and connected therewith at the upper and lower ends, a liquid receptacle communicating with the connections between said gage glass and said vessel at the lower end and having a gas inlet at the upper end, a gas generator, a support for said generator, and connections from said support to said gas inlet.

2. In a yeast tester, a gage glass, a vessel associated with said gage glass and having its side wall converging from the bottom to the top, said vessel being at the bottom connected with said gage glass and at the top connected with said gage glass, a liquid receptacle having an outlet at the lower end thereof connected with the lower connections of said gage glass and said vessel, and a gas inlet at the upper end, a container for the yeast and fermentable substance, a support for said container, and pipes leading from said container to said gas inlet.

3. In a yeast tester, a gage glass, a vessel associated with said gage glass and adjacent thereto, said vessel having a base portion and a side wall converging inwardly to an upper reduced portion, the side wall of said upper reduced portion converging to the top, a pipe communicating from the top of said vessel to said gage glass, a pipe communicating from the bottom of said vessel to said gage glass, a liquid receptacle having an outlet at the lower end thereof and a gas inlet at the upper end, a pipe having a cut off valve intermediate of the length thereof connecting said outlet to said lower connection between the vessel and the gage glass, a pipe leading from said gas inlet and having a laterally extending branch at the upper end thereof, a pipe having its socket at the outer end swinging at the end of said branch pipe, a yeast container and a valve in the joint between said branch pipe and said swinging pipe.

4. In a yeast tester, in combination, a liquid receptacle having a gas inlet at the upper end and a liquid outlet at the lower end, a vessel supported on a level with the level of the liquid in said receptacle and having sides tapering from the lower end to the upper end, a connection between said outlet and said vessel, a gage glass connected to the top of said vessel and to the bottom of said vessel through the connection to said liquid receptacle, a stand pipe extending upwardly from said gas inlet, a swinging arm in pipe form having a socket at the end thereof, and a flask held in said socket.

Signed at the city of Montreal, Quebec, Canada, this twenty-first day of June, 1913.

ARTHUR JOHN BANKS.

Witnesses:
THOMAS DORIAN,
E. DACKER.